US008828193B2

(12) United States Patent
Sundara et al.

(10) Patent No.: US 8,828,193 B2
(45) Date of Patent: Sep. 9, 2014

(54) PRODUCTION OF GRAPHENE USING ELECTROMAGNETIC RADIATION

(75) Inventors: Ramaprabhu Sundara, Chennai (IN); Eswaraiah Varrla, Kurnool (IN); Jyothirmayee Aravind Sasidharannair Sasikaladevi, Trivandrum (IN)

(73) Assignee: Indian Institute of Technology Madras, Tamil Nadu, Chennai (IN)

( * ) Notice: Subject to any disclaimer, the term of this patent is extended or adjusted under 35 U.S.C. 154(b) by 167 days.

(21) Appl. No.: 13/226,321

(22) Filed: Sep. 6, 2011

(65) Prior Publication Data

US 2013/0056346 A1    Mar. 7, 2013

(51) Int. Cl.
*C01B 31/02* (2006.01)
*C01B 31/04* (2006.01)
*B01J 19/12* (2006.01)

(52) U.S. Cl.
CPC .............. *C01B 31/0206* (2013.01); *C01B 31/02* (2013.01); *C01B 31/04* (2013.01); *B01J 19/127* (2013.01); *B01J 19/12* (2013.01); *Y10S 977/842* (2013.01); *Y10S 977/901* (2013.01)
USPC ......... 204/157.47; 977/842; 977/901

(58) Field of Classification Search
CPC ...... C01B 31/206; C01B 31/02; C01B 31/04; B01J 19/12; B01J 19/127
USPC ............... 204/157.47; 977/842, 901
See application file for complete search history.

(56) References Cited

U.S. PATENT DOCUMENTS

| 2,254,962 | A  | * | 9/1941  | Bitner et al. ............... 362/327 |
| 4,495,040 | A  | * | 1/1985  | Panico ..................... 422/186 |
| 5,556,517 | A  | * | 9/1996  | Smalley ................. 204/157.47 |
| 6,077,401 | A  | * | 6/2000  | Fields et al. ............ 204/157.47 |
| 7,572,482 | B2 | * | 8/2009  | Carothers et al. ........... 204/280 |
| 7,595,111 | B2 | * | 9/2009  | Udy ........................ 977/742 |
| 2009/0236609 | A1 | * | 9/2009  | de Heer et al. ............. 257/77 |
| 2010/0221508 | A1 | * | 9/2010  | Huang et al. ........... 204/157.47 |
| 2010/0266964 | A1 |   | 10/2010 | Gilje |
| 2011/0198313 | A1 | * | 8/2011  | Baraton et al. ............. 427/554 |
| 2011/0256014 | A1 |   | 10/2011 | Hong et al. |
| 2011/0318257 | A1 | * | 12/2011 | Sokolov et al. ......... 204/157.61 |
| 2012/0265122 | A1 | * | 10/2012 | El-Shall et al. ......... 204/157.47 |

OTHER PUBLICATIONS

Dreyer et al, "Reduction of graphite oxide using alcohols," J. Mater. Chem. 2011, vol. 21, pp. 3443-3447.*
Fellahi et al, "Silicon nanowire arrays-induced graphene oxide reduction under UV irradiation," Nanoscale, 2011, vol. 3, 4662.*
Zhang et al, "Direct imprinting of microcircuits on graphene oxides film by femtosecond laser reduction," Nano Today (2010), vol. 5, pp. 15-20.*
Zhou et al, "Microstructuring of graphene oxide nanosheets using direct laser writing," Adv. Mater. 2010, vol. 22, pp. 67-71.*
Abdelsayed, et al., Photothermal Deoxygenation of Graphite Oxide with Laser Excitation in Solution and Graphene-Aided Increase in Water Temperature, *J. Phys. Chem. Lett.* (Sep. 8, 2010), 1:2804-2809.

(Continued)

*Primary Examiner* — Keith Hendricks
*Assistant Examiner* — Colleen M Raphael
(74) *Attorney, Agent, or Firm* — Pepper Hamilton LLP (57) ABSTRACT

Methods for converting graphite oxide into graphene by exposure to electromagnetic radiation are described. As an example, graphene oxide may be rapidly converted into graphene upon exposure to converged sunlight.

16 Claims, 6 Drawing Sheets

(56) References Cited

OTHER PUBLICATIONS

Ajayan, et al., Nanotubes in a Flash—Ignition and Reconstruction, *Science* (Apr. 26, 2002), 296(5568):705.

Balandin, et al., Superior Thermal Conductivity of Single-Layer Graphene, *Nano Lett.* (Mar. 2008), 8(3):902-907.

Berger, et al., Ultrathin Epitaxial Graphite: 2D Electron Gas Properties and a Route Toward Graphene-Based Nanoelectronics, *J Phys Chem B* (2004), 108:19912-19916.

Chen, et al., Preparation of Graphene by the Rapid and Mild Thermal Reduction of Graphene Oxide Induced by Microwaves, *Carbon* (2009), 48:1146-1152.

Choucair, et al., Gram-Scale Production of Graphene Based on Solvothermal Synthesis and Sonication, *Nat Nanotechnol.* (Jan. 2009), 4(1):30-33.

Cote, et al., Flash Reduction and Patterning of Graphite Oxide and Its Polymer Composite, *J. Am. Chem. Soc.* (Aug. 12, 2009), 131:11027-11032.

Ding, et al., How Evaporating Carbon Nanotubes Retain Their Perfection?, *Nano Lett.* (Mar. 2007), 7(3):681-684.

Dresselhaus, et al., Perspectives on Carbon Nanotubes and Graphene Raman Spectroscopy, *Nano Lett.* (Mar. 10, 2010), 10(3):751-758.

Du, et al., Approaching Ballistic Transport in Suspended Graphene, *Nat Nanotechnol.* (Aug. 2008), 3(8):491-495.

Dubin, et al., A One-Step, Solvothermal Reduction Method for Producing Reduced Graphene Oxide Dispersions in Organic Solvents, *ACS Nano.* (Jul. 27, 2010), 4(7):3845-3852.

Fan, et al., Facile Synthesis of Graphene Nanosheets via Fe Reduction of Exfoliated Graphite Oxide, *ACS Nano.* (Jan. 25, 2011), 5(1):191-198.

Fan, et al., Deoxygenation of Exfoliated Graphite Oxide under Alkaline Conditions: A Green Route to Graphene Preparation, *Advanced Materials* (2008), 20:4490-4493.

Gao, et al., New Insights into the Structure and Reduction of Graphite Oxide, *Nat Chem.* (Aug. 2009), 1(5):403-408.

Guo, et al., A Green Approach to the Synthesis of Graphene Nanosheets, *ACS Nano.* (Sep. 22, 2009), 3(9):2653-2659.

Huang, et al., Flash Reduction of Graphic Oxide to Graphene, Northwestern University, Evanston, Illinois (printed from internet Mar. 2, 2011).

Huang, et al., Pulsed Laser Assisted Reduction of Graphene Oxide, *Carbon* (Feb. 19, 2011), 49:2431-2436.

Kaniyoor, et al., Graphene Synthesis Via Hydrogen Induced Low Temperature Exfoliation of Graphite Oxide, *Journal of Materials Chemistry* (2010), 20:8467-8469.

Kosynkin, et al., Longitudinal Unzipping of Carbon Nanotubes to Form Graphene Nanoribbons, *Nature* (Apr. 16, 2009), 458(7240):872-876.

Kumar, et al., Graphene Produced by Radiation-Induced Reduction of Graphene Oxide (last revised Sep. 26, 2010), Chemistry and Physics of Materials Unit, International Centre for Materials Science, New Chemistry Unit and CSIR Centre of Excellence in Chemistry, Jawaharlal Nehru Centre for Advanced Scientific Research, Jakkur P.O., Bangalore-560 064, India.

Lee, et al., Measurement of the Elastic Properties and Intrinsic Strength of Monolayer Graphene, *Science* (Jul. 18, 2008), 321(18):385-388.

LV, et al., Low-Temperature Exfoliated Graphenes: Vacuum-Promoted Exfoliation and Electrochemical energy storage, *ACS Nano.* (Nov. 24, 2009), 3(11):3730-3736.

McAllister, et al., Single Sheet Functionalized Graphene by Oxidation and Thermal Expansion of Graphite, *Chemistry of Materials* (2007), 19:4396-4404.

Niyogi, et al., Spectroscopy of Covalently Functionalized Graphene, *Nano Lett.* (Oct. 13, 2010), 10(10):4061-4066.

Novoselov, et al., Electric Field Effect in Atomically Thin Carbon Films, *Science* (Oct. 22, 2004), 306(5696):666-669.

Park, et al., Chemical Methods for the Production of Graphenes, *Nat Nanotechnol.* (Apr. 2009), 4(4):217-224.

Schniepp, et al., Functionalized Single Graphene Sheets Derived From Splitting Graphite Oxide, *J Phys Chem B* (May 4, 2006), 110(17):8535-8539.

Shin, et al., Efficient Reduction of Graphite Oxide by Sodium Borohydride and Its Effect on Electrical Conductance, *Adv. Funct. Mater.* (2009), 10:1987-1992.

Sokolov, et al., Formation of Graphene Features from Direct Laser-Induced Reduction of Graphite Oxide, *The Journal of Physical Chemistry Letters* (2010), 1:2633-2636.

Stankovich, et al., Synthesis of Graphene-Based Nanosheets Via Chemical Reduction of Exfoliated Graphite Oxide, *Carbon* (2007), 45:1558-1565.

Stankovich, et al., Graphene-Based Composite Materials, *Nature* (Jul. 20, 2006), 442(7100):282-286.

Subrahmanyam, et al., Blue Light Emitting Graphene-Based Materials and Their Use in Generating White Light, *Solid State Communications* (2010), 1-4.

Sun, et al., Nano-Graphene Oxide for Cellular Imaging and Drug Delivery, *Nano Research* (2008), 1:203-212.

Tung, et al., The Effects of Dopant on Morphology Formation in Polyaniline Graphite Nanoplatelet Composite, *Synthetic Metals* (2011), 161:177-182.

Wu, et al., Synthesis of Graphene Sheets with High Electrical Conductivity and Good Thermal Stability by Hydrogen Arc Discharge Exfoliation, *ACS Nano.* (Feb. 24, 2009), 3(2):411-417.

Xia, et al., Ultrafast Graphene Protodetector, *Nat Nanotechnol.* (Dec. 2009), 4(12):839-843.

Zhou, et al., Hydrothermal Dehydration for the "Green" Reduction of Exfoliated Graphene Oxide to Graphene and Demonstration of Tunable Optical Limiting Properties, *Chemistry of Materials* (2009), 21:2950-2956.

Zhu, et al., Reducing Sugar: New Functional Molecules for the Green Synthesis of Graphene Nanosheets, *ACS Nano.* (Apr. 27, 2010), 4(4):2429-2437.

Eswaraiah, et al., Top Down Method for Synthesis of Highly Conducting Graphene by Exfoliation of Graphite Oxide Using Focused Solar Radiation, *J. Mater. Chem* (Apr. 6, 2011), 21:6800-6803.

SolarLux Solar simulation Full Spectrum Lighting; (downloaded from http://www.eyesolarlux.com/solar-simulation-full-spectrum-lighting.htm on Aug. 9, 2011.

\* cited by examiner

PRODUCTION OF GRAPHENE USING ELECTROMAGNETIC RADIATION

TECHNICAL FIELD

This application relates to graphene, and methods for its production. In particular, methods employing electromagnetic radiation to form graphene are disclosed. In some embodiments, methods use focused electromagnetic radiation for the conversion of graphite oxide to graphene.

BACKGROUND

Graphene is a two dimensional sheet composed of $sp^2$ carbon atoms arranged in a honeycomb structure having a single atom thickness. Multiple sheets may be layered one atop another. The prospective applications for graphene are numerous due to its extraordinary properties including: high aspect ratio (length to thickness ratio), high young's modulus, high strength, and high thermal and electrical conductivity. However, the practical use of graphene in engineering applications demands massive production of high quality graphene. Conventional methods for preparing graphene are low-yielding, or use hazardous and costly chemicals, laborious methods, and/or high temperature treatments. Accordingly, better, safer, economically feasible, and higher yielding methods of producing graphene are needed.

SUMMARY

This disclosure is not limited to the particular systems, devices and methods described, as these may vary. The terminology used in the description is for the purpose of describing the particular versions or embodiments only, and is not intended to limit the scope.

Methods using focused electromagnetic radiation for the conversion of graphite oxide to graphene are described herein. These methods allow for the large-scale synthesis of graphene using a single-step approach, which may improve the availability and utility of graphene. These methods are environmentally friendly, use low temperatures, and are rapid.

In some embodiments, graphite oxide may be converted into grapheme by exposing the graphite oxide to electromagnetic radiation. In some embodiments, a method comprises contacting a first graphitic material having a first conductivity state with focused electromagnetic radiation to convert the first graphitic material into a second graphitic material having a second conductivity state, wherein the second conductivity state is higher than the first conductivity state.

In some embodiments, a kit for converting a graphitic material includes an apparatus for generating electromagnetic radiation of a desired intensity, a first graphitic material having a first conductivity state, and instructions for exposing the first graphitic material to electromagnetic radiation to convert at least a portion of the first graphitic material into a second graphitic material having a second conductivity state, wherein the second conductivity state is higher than the first conductivity state.

DETAILED DESCRIPTION

Methods using focused electromagnetic radiation for the conversion of graphite oxide to graphene are described herein. These methods allow for the large-scale synthesis of graphene using a single-step approach, which may improve the availability and utility of graphene. These methods are environmentally friendly, use low temperatures, and are rapid, particularly when compared to conventional techniques. In some embodiments, graphite oxide may be converted into graphene by exposing the graphite oxide to electromagnetic radiation. Graphene produced in this manner may find applications in electrically conducting polymer composites, advanced EMI shielding materials, nanofluidics, batteries, and environmental applications.

As used herein, "graphite oxide" refers to at least partially oxidized graphite, which may also be described as: graphitic oxide, graphitic acid, graphene oxide, or oxidized graphite nanoplatelets. Graphitic materials may be oxidized by numerous methods, and the specific method or extent of oxidation is not intended to limit the scope of the current application. Energy dispersive X-ray analysis spectra (EDX) may be recorded as a part of a field emission scanning electron microscopy (FESEM) experiment. In embodiments, graphite oxide may have an oxygen content of about 25 weight percent, about 30 weight percent, about 35 weight percent, about 40 weight percent, about 45 weight percent, or any value in between.

As used herein, "graphene" typically refers to an allotrope of carbon, comprising single sheets or less than about 3 sheets of substantially $sp^2$-bonded carbon atoms. In embodiments, prepared graphene may be less than 100% carbon. In some embodiments, prepared graphene may have an oxygen content of about 4 weight percent or less. In other embodiments, graphene may have an oxygen content of about 0.01 weight percent to about 10 weight percent, about 1.0 weight percent to about 6 weight percent, about 2.5 weight percent to about 4 weight percent, or any value or range of values in between. The remaining oxygen may be due to various sources such as —COOH and —OH molecules adsorbed on the surface of graphene.

Oxidation causes $sp^2$-bonded carbon to become $sp^3$-bonded, and may reduce the conjugation length of graphitic materials. Because a reduced conjugation length may decrease the electron mobility of a material, graphite oxide is typically considered an electrical insulator. In embodiments graphite oxide may have electrical conductivity equal to or less than, about $10^{-1}$ S/m, about $10^{-2}$ S/m, about $10^{-3}$ S/m, or any value in between. In other embodiments, graphite oxide may have electrical conductivity equal to or less than, about $10^{-3}$ S/m. Graphene, on the other hand, comprises substantially $sp^2$-bonded carbon atoms and may have extended conjugation lengths. In embodiments, graphene is an electrical conductor and may have an electrical conductivity equal to or greater than about 10 S/m, about 100 S/m, about 1,000 S/m, about 10,000 S/m, or any value in between. In some embodiments, graphene may have an electrical conductivity equal to or greater than about 1,400 S/m.

Figure 2:
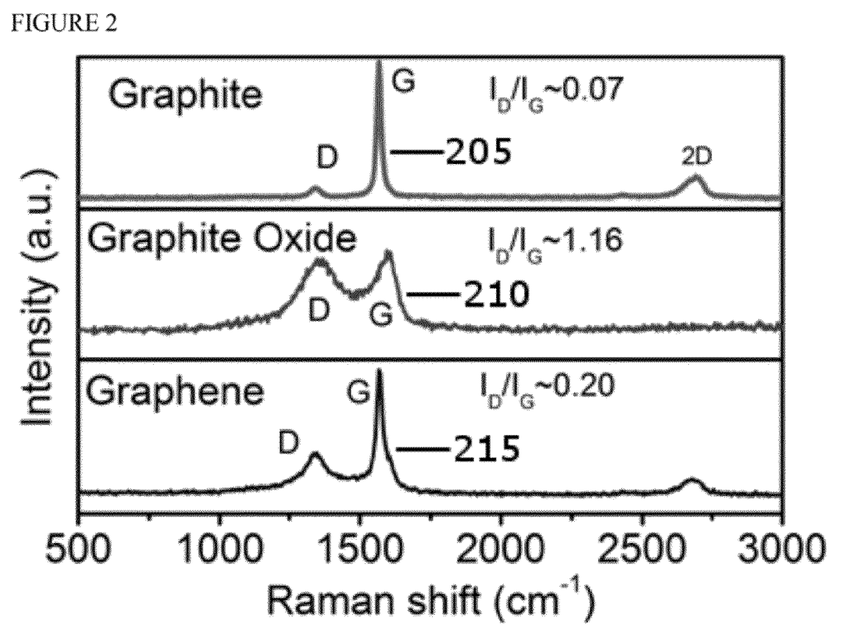
FIG. 2 is a collection of exemplary Raman spectra, in accordance with an embodiment.
Figure 3:
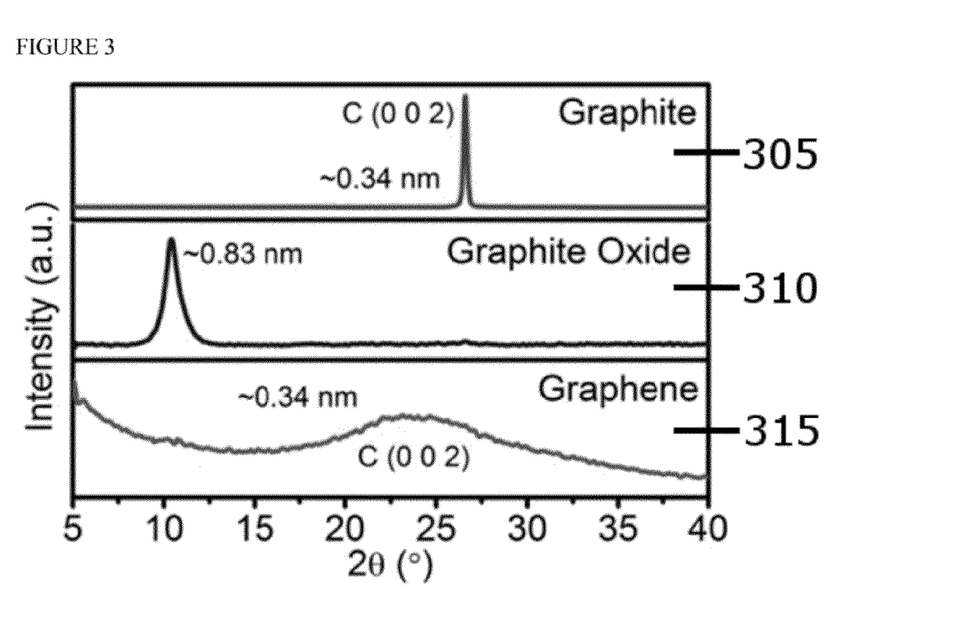
FIG. 3 is a collection of exemplary X-ray diffractograms, in accordance with an embodiment.

Raman spectroscopy may be useful in the characterization of various carbon forms because the resulting spectrum may be sensitive to the electronic structure of the material. Raman spectroscopy may be used to distinguish the nature of disorder in graphene and in graphite oxide. The Raman spectra of graphitic materials are generally characterized by two prominent features, (1) a G band at about 1567 cm$^{-1}$ due to first order Raman scattering of the $E_{2g}$ phonon at the Brillouin zone center of sp$^2$-bonded carbon atoms, and (2) a D band at about 1356 cm$^{-1}$ arising from the breathing mode of κ-point phonons with $A_{1g}$ symmetry at defect sites. The Raman spectrum of graphite oxide typically displays an large broad D band at about 1368 cm$^{-1}$ and a large broad G band at about 1604 cm$^{-1}$, and exhibits a shift to higher frequencies (blue shift) with respect to that of graphite. The broadening and shifted frequency (about 37 cm$^{-1}$) for the G band of graphite oxide may be attributed to the reduction in size of the in plane sp$^2$ domains due to oxidation of graphite. Referring to FIG. 2, the intensity ratio of the D band to the G band ($I_D/I_G$) for graphite ($I_D/I_G$~0.07) is typically increased to about 1.16 for graphite oxide, due to defects introduced by the disruption of aromaticity caused by the presence of various functional groups. In embodiments, a sharp G band (at about 1567.82 cm$^{-1}$) and an $I_D/I_G$ of about 0.20 for graphene may approximate those of pure graphite. The decrease in $I_D/I_G$ of graphene may be due to the restoration of sp$^2$ network. In some embodiments, the Raman spectrum of graphene may comprise bands at about 1360 cm$^{-1}$ and about 1570 cm$^{-1}$ and the intensity of the band at about 1360 cm$^{-1}$ may be less than or equal to about half the intensity of the band at about 1570 cm$^{-1}$.

Fourier transform infrared (FTIR) spectroscopy may be used to characterize the functional groups on a material. In embodiments, FTIR spectra show that graphite is essentially deficient of any functional groups except O—H stretching vibrations (at about 3427 cm$^-$) whereas graphite oxide may have one or more of the following functional groups: O—H stretching vibrations (at about 3432 cm$^{-1}$), CH$_2$ asymmetric and symmetric stretching vibrations (at about 2924 cm$^{-1}$ and about 2852 cm$^{-1}$), C=O stretching vibrations (at about 1825 cm$^{-1}$), C=C from unoxidized sp$^2$ C=C bonds (at about 1627 cm$^{-1}$), O—H bending deformation (at about 1408 cm$^{-1}$) and C—O vibrations (at about 1049 cm$^{-1}$). In embodiments, the FTIR spectra graphene may exhibit a broad O—H band (at about 3436 cm$^{-1}$), which may be due to adsorbed moisture.

Figure 4:
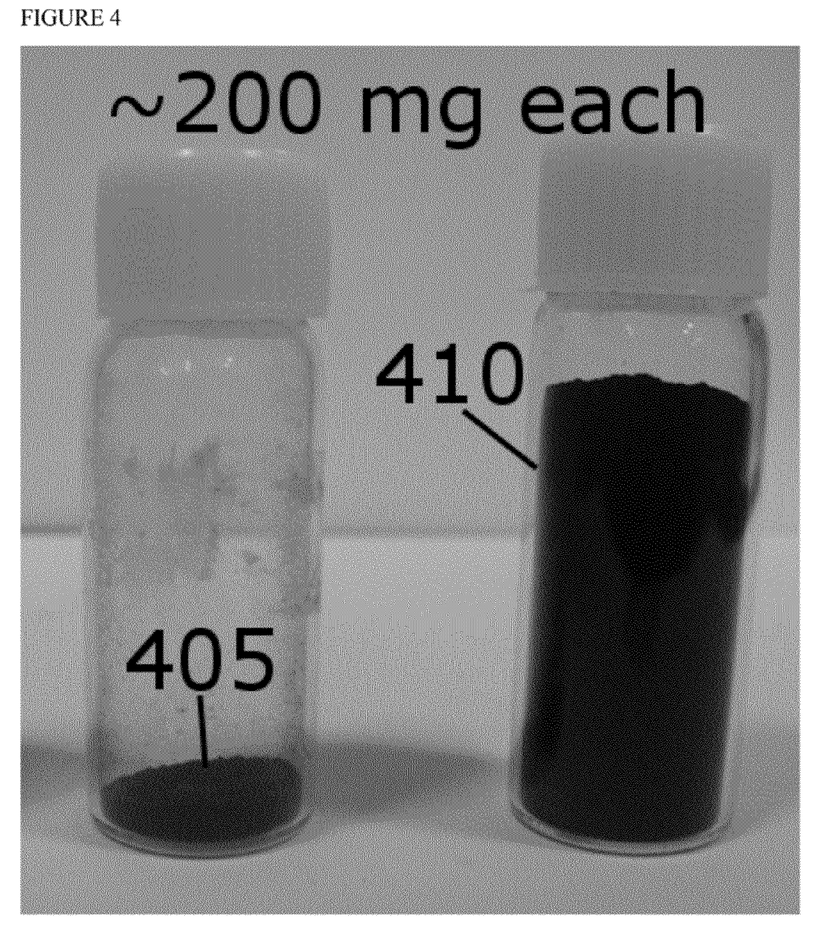
FIG. 4 is a photograph of exemplary samples of graphite oxide and graphene, in accordance with an embodiment.
Figure 5:
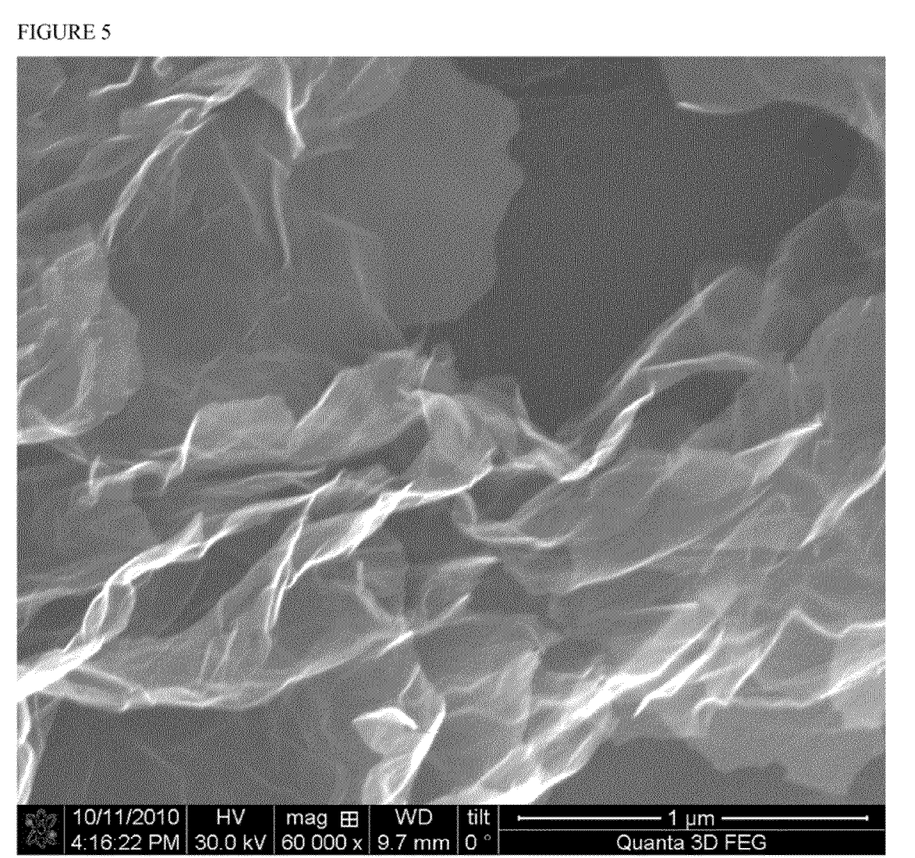
FIG. 5 is an exemplary field emission scanning electron micrograph (FESEM) of graphene, in accordance with an embodiment.
Figure 6:
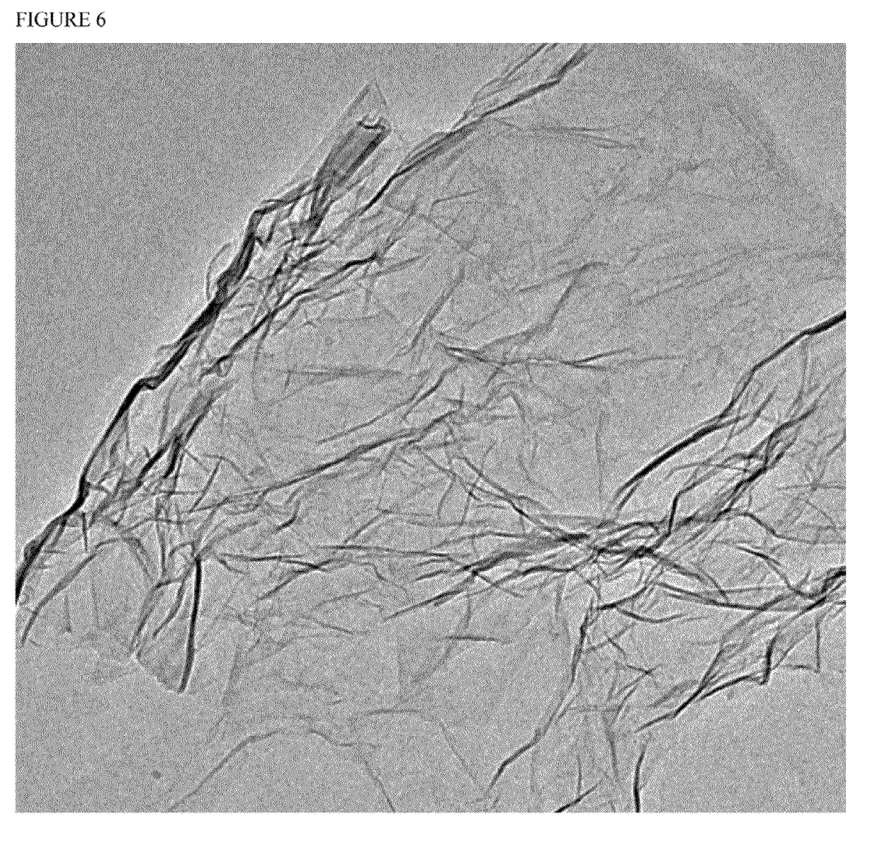
FIG. 6 is an exemplary transmission electron micrograph (TEM) of graphene, in accordance with an embodiment.

X-ray diffraction (XRD) may be used for the characterization of bond lengths and interlayer spacing of graphitic materials. The reflections from the C (002) plane of hexagonal graphite correspond to a peak with a 2θ value of about 26° in an XRD diffractogram. Interlayer spacing of the planes in graphite may be increased from about 3.35 Å 305 to about 8.36 Å in graphite oxide 310. Due to rapid heating of graphite oxide in the presence electromagnetic radiation, the decomposition rate of the oxygen-containing groups of graphite oxide may exceed the diffusion rate of the evolved gases during this rapid heating process, yielding pressures that exceed the van der Waals force holding the graphene sheets together in graphite oxide and lead to exfoliation of the graphite oxide. In embodiments, the produced graphene shows a weak and broader C (002) peak with a 2θ value of about 20° to about 24° which shows the exfoliation of graphite layers into a few layers of graphene 315. Exfoliation may be observed as the volume of graphite oxide 405 expands several fold upon conversion to graphene 410. FIG. 4 illustrates the marked volume expansion of an approximately equal amount of graphite oxide 405 and graphene 410. Referring to FIG. 5, a field emission scanning electron micrograph (FESEM) demonstrates the expanded nature of graphene made by an embodiment. Referring to FIG. 6, a transmission electron micrograph (TEM) shows a single sheet of graphene made by an embodiment.

In some embodiments, the method comprises providing a first graphitic material which is at least partially oxidized and has a first conductivity state; and exposing the first graphitic material to electromagnetic radiation to convert at least a portion of the first graphitic material to a second graphitic material having a second conductivity state which is higher than the first conductivity state and wherein the electromagnetic radiation is incident on the first graphitic material at an intensity that may be equal to or greater than about 1.1 watts/cm$^2$. In other embodiments, the intensity of the electromagnetic radiation incident on the first graphitic material may be between about 0.5 watts/cm$^2$ and about 7 watts/cm$^2$, about 1 watt/cm$^2$ and about 5 watts/cm$^2$, about 1.5 watts/cm$^2$ and about 3 watts/cm$^2$, or any value or range of values in between.

In some embodiments, the first graphitic material is graphite oxide. In some embodiments, the first graphitic material comprises at least partially oxidized graphitic materials selected from but not limited to graphite oxide, graphitic oxide, graphitic acid, graphene oxide, oxidized graphite nanoplatelets, oxidized carbon nanotubes, oxidized fullerenes, and combinations thereof.

In some embodiments, the second graphitic material is graphene. In some embodiments, the second graphitic material comprises graphitic materials comprising substantially sp$^2$-bonded carbon atoms, including but not limited to: graphite, graphite nanoplatelets, carbon nanotubes, and fullerenes.

In some embodiments, the method comprises providing a graphite oxide having a first conductivity state; and exposing the graphite oxide to electromagnetic radiation to convert at least a portion of the graphite oxide into graphene having a second conductivity state, wherein the second conductivity state is higher than the first conductivity state, and the electromagnetic radiation is incident on the graphite oxide at an intensity that may be equal to or greater than about 1.1 watts/cm$^2$. In other embodiments, the intensity of the electromagnetic radiation incident on the graphite oxide may be between about 0.5 watts/cm$^2$ and about 7 watts/cm$^2$, about 1 watt/cm$^2$ and about 5 watts/cm$^2$, about 1.5 watts/cm$^2$ and about 3 watts/cm$^2$, or any value or range of values in between.

Figure 1:
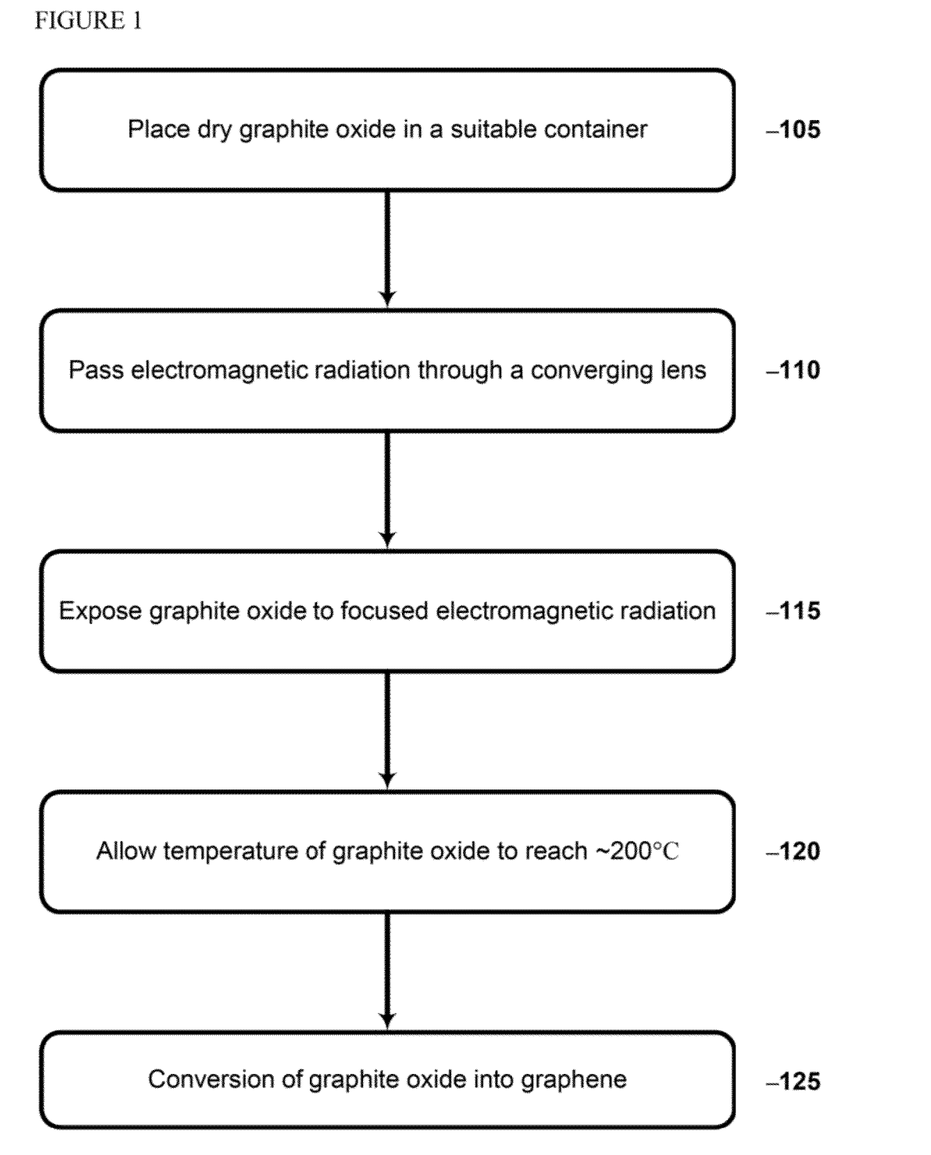
FIG. 1 is a flowchart that illustrates an exemplary method for converting graphite oxide into graphene, in accordance with an embodiment.

The resultant material has a higher conductivity state than the starting material. That is, through electromagnetic radiation, the first graphitic material, e.g. graphite oxide, having a first conductivity state is converted into a second graphitic material, e.g. graphene, having a higher, second conductivity state. In embodiments, the first conductivity state may be equal to or less than, about 10$^{-1}$ S/m, about 10$^{-2}$ S/m, about 10$^{-3}$ S/m, or any value in between. In other embodiments, the first conductivity state may be equal to or less than, about 10$^{-3}$ S/m. In embodiments, the higher conductivity state of the second graphitic material is higher than the first conductivity state and may be equal to or greater than about 10 S/m, about 100 S/m, about 1,000 S/m, about 10,000 S/m, or any value in between. In some embodiments, the higher conductivity state of the second graphitic material may be equal to or greater than about 1,400 S/m. In embodiments, dry graphite oxide may be converted into graphene by exposure to electromagnetic radiation. Dry graphite oxide may be placed 105 in a suitable container prior to exposure to electromagnetic radiation. Suitable containers may include, but are not limited to; Petri dishes, beakers, flask, trays, or other containers in which the graphite oxide can be spread in a layer on the surface.

In embodiments, the electromagnetic radiation may comprise one or more wavelengths from about 250 nm to about 2,500 nm. Specific examples of wavelengths include about 250 nm, about 500 nm, about 750 nm, about 1000 nm, about 1250 nm, about 1500 nm, about 1850 nm, about 2000 nm, about 2250 nm, about 2500 nm, and ranges between any two of these values. The source of electromagnetic radiation may be sunlight, simulated sunlight or a non-natural source such as, but not limited to an incandescent bulb, a flash tube, a LED, a laser, an IR lamp, a Xenon lamp, a UV lamps, a laser and a High Intensity Discharge lamp, or combinations thereof, selected portions thereof, or selected portions of combinations thereof.

In embodiments, the intensity of the electromagnetic radiation may be increased by passing it through at least one refractile material prior to exposing the graphite oxide to the electromagnetic radiation. The intensity of the electromagnetic radiation may be increased by passing 110 it through at least one converging lens prior to the exposing step 115. In embodiments, passing the electromagnetic radiation through a refractile material may increase the intensity by about 3,000 percent. In embodiments, the intensity of the electromagnetic radiation contacting the graphite oxide may be greater than about 1.1 watts/cm$^2$. In other embodiments, the intensity of the electromagnetic radiation contacting the graphite oxide may be between about 0.5 watts/cm$^2$ and about 7 watts/cm$^2$, about 1 watt/cm$^2$ and about 5 watts/cm$^2$, about 1.5 watts/cm$^2$ and about 3 watts/cm$^2$, or any value or range of values in between.

In other embodiments, the electromagnetic radiation may be synthetically generated at the desired intensity or otherwise focused or concentrated to the desired intensity. In some embodiments, the electromagnetic radiation may be concentrated by reflecting off of a converging mirror.

The exposure of graphite oxide to electromagnetic radiation may cause rapid heating of the graphite oxide. The conversion of graphite oxide to graphene by exposure to electromagnetic radiation may occur at low temperatures. In embodiments, exposure to electromagnetic radiation may heat the exposed graphite oxide at a rate of about 100° C. per second. In embodiments, exposure to electromagnetic radiation may heat the exposed graphite oxide suddenly to between about 150° C. and about 200° C. over a time period of about 1 to about 2 seconds. After the initial heating period, the exposing step 115 may be maintained 120 at less than about 200° C. In some embodiments, the temperature of the exposing step may be maintained at less than about 100° C., about 175° C., about 250° C., about 350° C., about 500° C., or any value in between. In some embodiments, the temperature of the exposing step may be fluctuate between about 25° C. and about 1,000° C., about 100° C. and about 500° C., about 125° C. and about 250° C., about 150° C. and about 200° C., or any value or range of values in between. The conversion 1.25 of graphite oxide to graphene by exposure to electromagnetic radiation may be rapid. In embodiments, the exposing step may be performed less than about 10 minutes, less than about 5 minutes, less than about 2 minutes, or less than about 1 minute.

A low conductivity graphitic material may be converted into a high conductivity graphitic material by contacting the low conductivity graphitic material with focused electromagnetic radiation. In embodiments, the low conductivity graphitic material may be graphite oxide or any other at least partially oxidized graphitic material. In embodiments, the high conductivity graphitic material may be graphene or any other substantially sp$^2$-bonded graphitic materials.

In an embodiment, a kit for converting low conductivity graphitic material may be provided. The kit may comprise: an apparatus for generating electromagnetic radiation of a desired intensity; a low conductivity graphitic material, and instructions for exposing the low conductivity graphitic material to electromagnetic radiation to convert at least a portion of the low conductivity graphitic material into a high conductivity graphitic material.

The low conductivity graphitic material provided in the kit may comprise oxidized graphite or any other at least partially oxidized graphitic material. In embodiments, the low conductivity graphitic material may be converted into a high conductivity graphitic material comprising graphene or any other substantially sp$^2$-bonded graphitic materials.

The apparatus for generating electromagnetic radiation provided in the kit may generate electromagnetic radiation comprising one or more wavelengths from about 250 nm to about 2,500 nm, about 200 nm to about 400 nm, about 400 nm to about 780 nm, about 780 nm to about 10,000 nm, or any value or range of values in between with a desired intensity of at least about 1.1 watts/cm$^2$. In some embodiments, the desired intensity may be between about 0.5 watts/cm$^2$ and about 7 watts/cm$^2$, about 1 watt/cm$^2$ and about 5 watts/cm$^2$, about 1.5 watts/cm$^2$ and about 3 watts/cm$^2$, or any value or range of values in between.

The apparatus for generating electromagnetic radiation provided in the kit may comprise a converging lens arranged and configured to concentrate a natural or artificial source of electromagnetic radiation to the desired intensity. The apparatus for generating electromagnetic radiation provided in the kit may comprise a source of electromagnetic radiation. The source of electromagnetic radiation may comprise sunlight, an incandescent bulb, a flash tube, a LED, a laser, or combinations thereof.

Embodiments illustrating the method and materials used may be further understood by reference to the following non-limiting examples.

EXAMPLES

Example 1

Conversion of Graphite Oxide to Graphene with Focused Solar Radiation

Graphite oxide (5 grams) was spread over a Petri dish and subjected to focused solar radiation using a converging lens of 90 mm in diameter. Sunlight is made up of both visible and non-visible light spanning the range of about 250 nm to about 2500 nm. The measured power of the focused radiation ranged from 1.77 W to about 2.03 W per cm$^2$. The temperature raised suddenly (in 1-2 seconds) from room temperature (about 25° C.) to between 150° C. and 200° C. Upon exposure to the focused solar radiation, a popping sound was heard from the graphite oxide. A color change from light brown to dark black was observed upon exposure to the solar radiation. The reaction was complete in less than about 5 minutes. The Raman spectrum of the product graphene had a D band at 1360 cm$^{-1}$, a G band at 1570 cm$^{-1}$, and an $I_D/I_G$ of 0.20—similar to graphite ($I_D/I_G$=0.07). The conductivity of the product graphene was found to be 1.494×10$^3$ S/m, also similar to that of graphite (conductivity ~10$^5$ S/m). For comparison, graphite oxide is insulating, with an electrical conductivity of ~10$^{-5}$ S/m. Atomic force microscopy (AFM) was used to determine the height profile of individual structures, and it was found that the product graphene was present as two stacked graphene sheets with a height of about 0.9 to about 1.4 nm.

Example 2

Conversion of Graphite Oxide to Graphene with Artificial Light

Graphite oxide is spread over a flat surface and is subjected to emission from a 100 W quartz tungsten halogen incandescent bulb configured to have a power of about 2 W per $cm^2$ and filtered with a band-pass filter transmitting between 580 nm and 700 nm. The temperature of the graphite oxide quickly increases to about 175° C. and turns from brown to black.

The illustrative embodiments described in the detailed description and claims are not meant to be limiting. Other embodiments may be used, and other changes may be made, without departing from the spirit or scope of the subject matter presented herein. It will be readily understood that the aspects of the present disclosure, as generally described herein, may be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description or claims, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 substituents refers to groups having 1, 2, or 3 substituents. Similarly, a group having 1-5 substituents refers to groups having 1, 2, 3, 4, or 5 substituents, and so forth.

What is claimed is:

1. A method of converting graphite oxide to graphene, the method comprising:
   focusing sunlight to produce focused sunlight;
   exposing graphite oxide having a first conductivity state to the focused sunlight for a period of time sufficient to convert at least a portion of the graphite oxide into graphene having a second conductivity state, wherein the second conductivity state is higher than the first conductivity state; and
   wherein the focused sunlight is incident on the graphite oxide at an intensity from about 0.5 watts/$cm^2$ to about 7 watts/$cm^2$.

2. The method of claim 1, wherein the focused sunlight comprises one or more wavelengths from about 250 nm to about 2,500 nm.

3. The method of claim 1, wherein focusing sunlight comprises passing the sunlight through at least one refractile material prior to the exposing step to increase the intensity of the sunlight.

4. The method of claim 1, wherein focusing sunlight comprises passing the sunlight through at least one converging lens prior to the exposing step to increase the intensity of the sunlight.

5. The method of claim 1, wherein focusing sunlight comprises reflecting the sunlight off of one or more converging mirrors to increase the intensity of the sunlight.

6. The method of claim 1, wherein the graphite oxide comprises dry graphite oxide.

7. The method of claim 1, wherein the exposing step heats the graphite oxide to a final temperature at a rate of at least about 100° C. per second for less than about 2 seconds, and maintains the final temperature for the remainder of the step.

8. The method of claim 1, wherein the exposing step heats the graphite oxide to a temperature of less than about 200° C.

9. The method of claim 1, wherein the exposing step is performed for no more than about 10 minutes.

10. The method of claim 1, wherein the exposing step is performed for no more than about 5 minutes.

11. The method of claim 1, wherein the first conductivity state is less than about $10^{-3}$ S/m.

12. The method of claim 1, wherein the first conductivity state is about $10^{-5}$ S/m.

13. The method of claim 1, wherein the second conductivity state is greater than about 1,000 S/m.

14. The method of claim 1, wherein the second conductivity state is greater than about 1,400 S/m.

15. The method of claim 1, wherein the graphene has an oxygen content less than about 5% by weight.

16. The method of claim 1, wherein a Raman spectrum of the graphene comprises bands at about 1360 $cm^{-1}$ and about 1570 $cm^{-1}$, and the intensity of the band at about 1360 $cm^{-1}$ is less than or equal to about half the intensity of the band at about 1570 $cm^{-1}$.

* * * * *

UNITED STATES PATENT AND TRADEMARK OFFICE
CERTIFICATE OF CORRECTION

PATENT NO.       : 8,828,193 B2
APPLICATION NO.  : 13/226321
DATED            : September 9, 2014
INVENTOR(S)      : Sundara et al.

It is certified that error appears in the above-identified patent and that said Letters Patent is hereby corrected as shown below:

On the Title Page, in item (56), under "OTHER PUBLICATIONS", in Column 2, Line 1, delete "et al," and insert -- et al., --, therefor.

On the Title Page, in item (56), under "OTHER PUBLICATIONS", in Column 2, Line 3, delete "et al," and insert -- et al., --, therefor.

On the Title Page, in item (56), under "OTHER PUBLICATIONS", in Column 2, Line 5, delete "et al," and insert -- et al., --, therefor.

On the Title Page, in item (56), under "OTHER PUBLICATIONS", in Column 2, Line 8, delete "et al," and insert -- et al., --, therefor.

In the Specification

In Column 1, Line 44, delete "grapheme" and insert -- graphene --, therefor.

In Column 3, Line 14, delete "an large" and insert -- a large --, therefor.

In Column 5, Line 54, delete "conversion 1.25" and insert -- conversion 125 --, therefor.

Signed and Sealed this
Twenty-fourth Day of February, 2015

Michelle K. Lee
*Deputy Director of the United States Patent and Trademark Office*